Dec. 17, 1935.    M. E. LANGEBRAKE    2,024,374
OVERHEAD IRRIGATION SYSTEM
Filed June 14, 1935
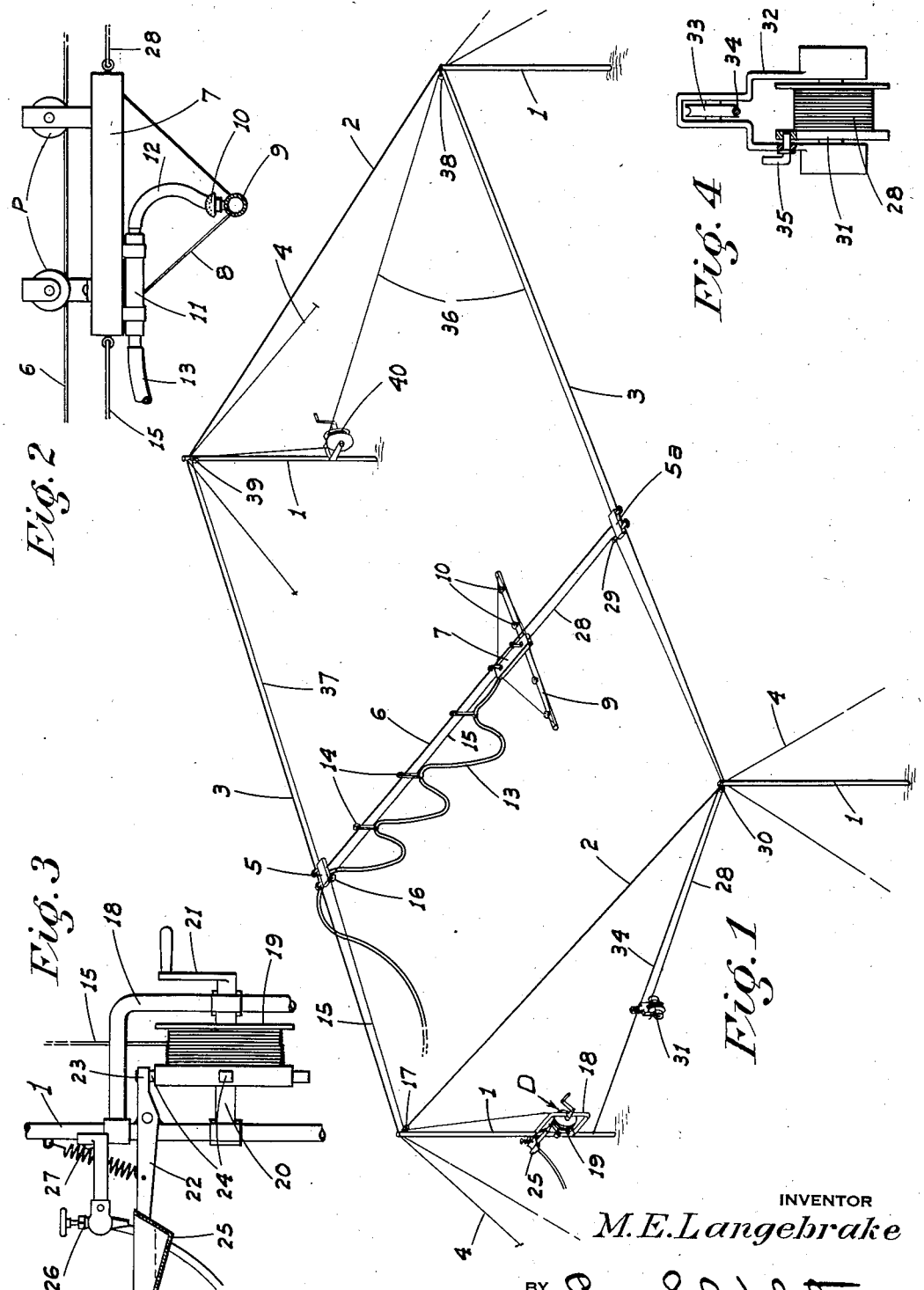
INVENTOR
M. E. Langebrake
BY
ATTORNEY Patented Dec. 17, 1935

2,024,374

UNITED STATES PATENT OFFICE 2,024,374

OVERHEAD IRRIGATION SYSTEM

Moody E. Langebrake, Jamestown, Calif.

Application June 14, 1935, Serial No. 26,587

11 Claims. (Cl. 299—55)

This invention relates generally to an irrigation system and is directed particularly and specifically to an overhead irrigation or sprinkling system.

The principal object of my invention is to provide an overhead irrigation system having a relatively small nozzle or water discharge unit which may be moved to progressively irrigate the entire area of a relatively large plot of ground embraced by my system.

An additional object of my invention is to provide a device whereby the operator may regulate the device to automatically irrigate any particular portion of the plot.

A further object of my invention is to provide a novel intermittent and automatic release for the drum upon which one of the control cables is wound.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a perspective view of my irrigation system as installed over a plot of ground.

Figure 2 is an enlarged elevation of the sprinkler supporting bar and pulleys mounted thereon.

Figure 3 is an enlarged side elevation of the automatic drum release mechanism.

Figure 4 is an enlarged side elevation of the weighted traveling drum.

Referring now more particularly to the characters of reference on the drawing, the numeral 1 denotes four posts each having its lower end embedded in the earth at one corner of the rectangular plot of ground to be irrigated. Secured to and supported from the tops of these posts are parallel stay wires 2 and parallel supporting wires 3. One of these parallel wires 3 is less distant from the ground than the other; the posts on one side of the plot being correspondingly shorter than the posts on the other side. Guy wires 4 attached to each post prevent bowing of the posts 1, and tend to keep wires 2 and 3 taut.

Stretched between and secured to pulley blocks 5 and 5a which respectively engage the high and low supporting wires 3, is another supporting wire 6 at right angles to the wires 3; said wire 6 sloping downwardly toward one end due to the fact that one wire 3 is closer to the ground than the other wire 3. This supporting wire 6 will hereinafter be entitled the sprinkler supporting wire.

Suspended from pulleys P which run on the sprinkler supporting wire 6 is a sprinkler supporting bar 7 and below which is suspended at right angles thereto on wires 8 a sprinkler pipe 9. Upstanding from this pipe 9 are spaced sprinkler heads 10.

A hose coupling 11 is secured to the under side of the bar 7 and connects at one end with a short length of flexible hose 12 which leads down to a central connection with the sprinkler pipe.

The other end of the coupling 11 connects with a flexible water supply hose 13 which is suspended as loops at spaced intervals by means of pulleys 14 from the sprinkler supporting wire 6. This hose 13 is also fixedly secured to the pulley block 5 and then extends down to the ground and to a connection with the source of water supply (not shown).

A small flexible cable 15 is secured to the end of the bar 7 at the end adjacent the pulley block 5 and extends about a pulley 16 secured to the block 5. This cable then extends over a pulley 17 on the upper end of one of the posts 1 and down to a drum device indicated generally at D.

This drum device D is a cable releasing structure adapted to intermittently release a certain length of cable. The device comprises a frame 18 mounted on the post 1. A cable drum 19 is secured on a shaft 20 journaled between the frame and the post. A crank 21 is secured to one end of the shaft 20.

Pivoted on the post 1 axially of and above the drum 19 is an arm 22 adapted to engage at its inner end, as at 23, with stop elements 24 projecting radially from and spaced about the periphery of the drum. A bucket 25 is secured to the outer end of the arm 22 and is adapted to be filled with water from a drip faucet 26 mounted immediately above the bucket. A spring 27 connected to the arm between the pivot and bucket from a point on the post above the bucket prevents downward movement of the bucket until it is full of water.

Another small flexible cable 28 is attached to the end of the bar 7 at the end adjacent the pulley block 5a and extends through a pulley 29 secured to said block and then runs along substantially parallel to the adjacent wire 3 in the same direction as the cable 15. Said cable then passes over a pulley 30 on the upper end of corresponding post 1.

From this pulley 39 the cable 28 extends down to a weighted drum 31 about which the remainder of the cable is wound. The supporting hangar 32 of the drum is provided with a pulley 33 and depends from and is slidably supported on a diagonal wire 34 whose length is at least equal to that of the wire 6.

To prevent unwinding of the cable from the drum the hangar is provided with a releasable catch pin 35 engaging the drum on one side as shown in Figure 4.

Secured at their ends to the pulley blocks 5 and 5a respectively are flexible cables 36 and 37 which extend along parallel with the wires 3 in the direction opposite to cables 15 and 28 to pulleys 38 and 39 respectively on the corresponding corner posts 1 and from which the cables extend down to and about the drum of a hand operated windlass 40 mounted on one of the end posts.

*Operation*

For operation, the sprinkler supporting bar 7 is moved along the wire 6 up to a point adjacent the pulley block 5 or in other words up to the high end of the wire 6; and said wire 6 is moved to adjacent the end posts on which pulleys 17 and 39 are mounted. When in this position, the drum 19 is wound up to take all slack from the cable 15 while the cable 28 is wound about the drum 31 until said weighted drum is suspended from the high end of the wire 34.

The water is then turned on in the supply hose 13 and sprays out of the sprinkler heads 10 irrigating the adjacent ground.

The faucet 26 is also opened and a small amount of water allowed to run into the bucket 25 which when full tips down and releases the arm from the adjacent stop element. The drum then rotates due to the pull on the cable 15 as the entire sprinkler unit tends to slide down the sloping wire 6 due to the action of gravity and the pull of cable 28.

This movement is however stopped by the arm 22 returning to its normal position and engaging another stop element on the drum after the bucket has emptied. The cable 28 and weighted drum 31 slides down the wire 34 and supplements the gravitational movement of the sprinkler unit down the wire 6.

In the above manner, the sprinkler will automatically and progressively irrigate an entire strip of ground without attention. When the sprinkling unit has reached its limit of movement, along wire 6, it is again reset as heretofore described and the wire 6 moved longitudinally of the wires 3 by means of the cables 36 and 37 and windlass 40. The automatic movement of the sprinkler may then again take place to irrigate another strip of ground.

Of course whenever the wire 6 is moved longitudinally, the cables 15 and 28 must be readjusted for proper operation.

Not only is the above system valuable for irrigation but it may also be used for plant spraying with insecticides by merely replacing the sprinkler heads with spray nozzles.

For another modification of this invention, I may attach hose sections to the water outlets on the pipe 9 and by lowering this pipe 9 down close above the tops of the plans, permit the hose sections to irrigated the furrows without wetting the foliage of the plants.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. An overhead irrigation system comprising a sprinkler unit, a substantially horizontal member supported above the ground along which the unit is movable and from which the unit is suspended, means to supply water to the sprinkler unit, means to move the unit along the member in one direction, and intermittently released holding means preventing such movement of the unit along the member.

2. An overhead irrigation system comprising a sprinkler unit, a length of wire supported above the ground and from which the unit is suspended, means to supply water to the sprinkler unit, means to move the unit along the wire in one direction, holding means normally preventing such movement, and water actuated means to intermittently release the holding means to permit movement of the unit along the wire.

3. An overhead irrigation system comprising a sprinkler unit, a length of wire supported above the ground and from which the unit is suspended, means to supply water to the sprinkler unit, said wire having a downward slope from one end to the other whereby the unit will tend to move along said wire in one direction by gravity, and means to intermittently prevent such gravity action from being effective.

4. An overhead irrigation system comprising a pair of spaced parallel supporting wires suspended above the ground, another supporting wire extending at right angles between said first named wires and supported at its ends from said first named wires for movement lengthwise thereof, a sprinkler unit suspended from and slidable along said last named wire, means to supply water to the sprinkler unit, and means to progressively move the sprinkler unit longitudinally of said last named wire.

5. A device as in claim 4, including means to move said last named wire longitudinally of said first named wires while maintaining the same at right angles thereto.

6. A device as in claim 4, in which said last named means comprises means to move the sprinkler unit along said last named wire in one direction by gravity, a cable connected to the sprinkler unit and extending in a direction opposite to the gravity pull on the unit, a drum about which the cable is wound, and means to intermittently release a predetermined amount of such cable from the drum.

7. A device as in claim 4, in which said last named means comprises a cable connected at one end to the sprinkler unit, a weight to which the other end of the cable is connected, a sloping wire on which said weight is slidable, another cable connected to the sprinkler unit and extending in a direction opposite to the first named cable, a drum about which the last named cable is wound, and means to intermittently release a predetermined amount of such cable from the drum.

8. An overhead sprinkler system comprising a pair of horizontally spaced parallel wires supported at their ends above the ground, pulley blocks slidable on the wires, another wire stretched between the blocks, a sprinkler unit slidable along said other wire, a flexible supply hose connected at one end to the unit and extending thence under and lengthwise of said other wire to and supported by one block, and separate pulleys mounted for movement along said other wire between the unit and said block and supporting the hose at spaced points in the adjacent portion thereof.

9. An overhead sprinkler system comprising a pair of horizontally spaced parallel wires, posts supporting the wires at their ends a predetermined distance from the ground, said posts being adjacent the corners of the area to be irrigated, an element extending between and supported by said wires for movement along the same, means to thus move said element, a sprinkler unit supported by and movable along the element, and means to control the movement of the unit.

10. An overhead sprinkler system comprising a pair of horizontally spaced parallel wires supported at their ends above the ground, pulley blocks slidable on the wires, another wire stretched between the blocks, a sprinkler unit slidable along said other wire, means to control the movement of the unit along said wire, pull wires projecting from the blocks to one end of said first named wires, and a wind-up drum mounted in connection with said first named wires at said end thereof and about which said pull wires are wound.

11. An overhead sprinkler system comprising a pair of horizontally spaced parallel wires supported at their ends above the ground, pulley blocks slidable on the wires, another wire stretched between the blocks, a sprinkler unit slidable along said other wire, means to move said other wire in one direction, a pull wire attached to the unit and extending to one block and thence along the adjacent first named wire to the end of the same opposite that toward which said other wire is moved by said means, a drum about which said pull wire is wound, means to control the rotation of the drum in a paying-out direction, another pull wire extending from the unit to the other block and then along the corresponding first named wire to the same end as that to which the first named pull wire extends, a weighted drum about which said other pull wire is wound, releasable means to prevent a paying-out rotation of said drum, and a support for said weighted drum along which the same may freely slide.

MOODY E. LANGEBRAKE.